United States Patent
Jorguseki et al.

(10) Patent No.: US 9,462,544 B2
(45) Date of Patent: Oct. 4, 2016

(54) METHOD AND TELECOMMUNICATIONS INFRASTRUCTURE FOR ACTIVATING AN INACTIVE CELL

(71) Applicants: Koninklijke KPN N.V., The Hague (NL); Nederlandse Organisatie voor Toegepast—Natuurwetenschappelijk Onderzoek TNO, 's-Gravenhage (NL)

(72) Inventors: Ljupco Jorguseki, The Hague (NL); Remco Litjens, Voorschoten (NL); Haibin Zhang, The Hague (NL)

(73) Assignees: Koninklijke KPN N.V., The Hague (NL); Nederlandse Organisatie voor Toegepast-Natuurwetenschappelijk Onderzoek TNO, 's-Gravenhage (NL)

( * ) Notice: Subject to any disclaimer, the term of this patent is extended or adjusted under 35 U.S.C. 154(b) by 0 days.

(21) Appl. No.: 14/937,303

(22) Filed: Nov. 10, 2015

(65) Prior Publication Data
US 2016/0066265 A1   Mar. 3, 2016

Related U.S. Application Data

(63) Continuation of application No. 13/696,267, filed as application No. PCT/EP2011/057093 on May 4, 2011, now Pat. No. 9,210,590.

(30) Foreign Application Priority Data

| May 6, 2010 | (EP) | .................... 10162192 |
| Oct. 11, 2010 | (EP) | .................... 10187119 |
| Dec. 24, 2010 | (EP) | .................... 10196958 |

(51) Int. Cl.
*H04B 7/00* (2006.01)
*H04M 1/00* (2006.01)
(Continued)

(52) U.S. Cl.
CPC ......... *H04W 52/0206* (2013.01); *H04W 24/02* (2013.01); *H04W 24/10* (2013.01); *H04W 52/0225* (2013.01); *H04W 48/12* (2013.01); *Y02B 60/50* (2013.01)

(58) Field of Classification Search
CPC .............................. H04W 72/00; H04W 36/00

USPC ....................... 455/436, 439, 422.1
See application file for complete search history.

(56) References Cited

U.S. PATENT DOCUMENTS

| 8,121,093 B2 * | 2/2012 | Chen ..................... H04W 48/20 370/331 |
| 8,467,798 B2 * | 6/2013 | Lee ....................... H04W 36/22 455/450 |

(Continued)

FOREIGN PATENT DOCUMENTS

| JP | 2009-231912 | 10/2009 |
| WO | WO2008131588 A1 | 11/2008 |

(Continued)

OTHER PUBLICATIONS

PCT International Search Report, PCT International Application No. PCT/EP2011/057093 dated Jun. 8, 2011.

(Continued)

*Primary Examiner* — Tilahun B Gesesse
(74) *Attorney, Agent, or Firm* — McDonnell Boehnen Hulbert & Berghoff LLP (57) ABSTRACT

The invention relates to a method for activating at least one inactive cell in a wireless telecommunications infrastructure. The telecommunications infrastructure comprises an active cell containing a plurality of terminals. A presence signal is transmitted in the at least one inactive cell. The plurality of terminals in the active cell detect the presence signal(s) of the one or more inactive cells to gather information from the inactive cell. The information is reported to and received at the telecommunications infrastructure. The information received from the plurality of terminals is processed in a processing system of the telecommunications infrastructure to provide a processing result. The inactive cell is activated when the processing result fulfills at least one activation condition such that at least one of the plurality of terminals is within a coverage area of the activated cell.

1 Claim, 6 Drawing Sheets

(51) Int. Cl.
*H04W 52/02* (2009.01)
*H04W 24/02* (2009.01)
*H04W 24/10* (2009.01)
*H04W 48/12* (2009.01)

(56) References Cited

U.S. PATENT DOCUMENTS

| | | | | |
|---|---|---|---|---|
| 2010/0002614 A1* | 1/2010 | Subrahmanya | H04W 52/244 | 370/311 |
| 2010/0093355 A1* | 4/2010 | Voyer | H04W 36/04 | 455/436 |
| 2011/0092212 A1* | 4/2011 | Kubota | H04W 52/0225 | 455/436 |
| 2012/0094661 A1* | 4/2012 | Frenger | H04W 52/343 | 455/434 |
| 2014/0302856 A1* | 10/2014 | Nory | H04W 48/10 | 455/437 |

FOREIGN PATENT DOCUMENTS

| | | |
|---|---|---|
| WO | WO2009/140988 A1 | 11/2009 |
| WO | WO2010/002991 A1 | 1/2010 |

OTHER PUBLICATIONS

"Self Organizing Network—NEC's Proposals for Next-Generation Radio Network Management", White Paper, Feb. 2009, NEC Corporation, pp. 1-5.

"3rd Generation Partnership Project; Technical Specification Group Radio Access Network; Universal Terrestrial Radio Access (UTRA) and Evolved Universal Terrestrial Radio Access (E-UTRA); Radio Measurement Collection for Minimization of Drive Tests (MDT); Overall Description; Stage 2 (Release 10)", 3GPP TS 37.320, V10.0.0, Dec. 2010, pp. 1-17.

"3rd Generation Partnership Project; Technical Specification Group Radio Access Network; Evolved Universal Terrestrial Radio Access Network (E-UTRAN); Self-Configuring and Self-Optimizing Network (SON) Use Cases and Solutions (Release 9)", 3GPP TR 36.902 V9.1.0 (Mar. 2010), pp. 1-23.

European Search Report, European Patent Application No. 10162192.8, dated Dec. 15, 2010.

Mitsubishi Electric, "Dynamic Setup of HNBs for Energy Savings and Interference Reduction", 3GPP TSG RAN WG3 Meeting #61, Jeju Island, Korea, Aug. 18-22, 2008, 7 pages.

Ericsson, "Sustainable Energy for Mobile Communications", White Paper, Jun. 2007, pp. 23.

* cited by examiner

METHOD AND TELECOMMUNICATIONS INFRASTRUCTURE FOR ACTIVATING AN INACTIVE CELL

CROSS REFERENCE TO RELATED APPLICATIONS

The present application is a continuation of and claims priority to U.S. application Ser. No. 13/696,267, filed Nov. 5, 2102, which is a national stage entry of PCT/EP2011/057093, filed May 4, 2011, and claims priority to EP 10162192.8, filed May 6, 2010; EP 10187119.2, filed Oct. 11, 2010; and EP 10196958.2, filed Dec. 24, 2010, all five of which are incorporated herein by reference.

FIELD OF THE INVENTION

The invention relates to the field of telecommunications infrastructures. More specifically, the invention relates to the field of activating inactive cells of a telecommunications infrastructure for purposes such as controlling energy consumption and electromagnetic radiation, particularly reducing energy consumption or electromagnetic radiation.

BACKGROUND OF THE INVENTION

The operation of wireless access networks for enabling wireless communication is highly energy consuming. In view of current environmental concerns, increased attention is paid recently to the energy consumption of telecommunications networks.

Various studies have been performed to reduce conventional energy consumption in wireless access networks, e.g. by exploring the option of using sustainable energy sources (Ericsson AB White Paper "Sustainable energy use in mobile communications, June 2007).

With the development of the 3GGP Long Term Evolution (LTE) network, energy saving for the network is also approached in the context of self organizing networks (SON). In a White Paper of NEC, dated February 2009, "NEC's proposals for next-generation radio network management", energy is considered as a significant part of the operation expenses of a cellular network. It is recognized that the main saving potential resides in using variations in load over time, that allows to switch off parts of the resources, for example during the night. When a complete base station is switched off, other base stations of the access network need to make up for the reduction in coverage area and capacity. This requires coordination between the nodes. A similar use case is described in 3GGP TR 36.902 v9.1.0 "Self-configuring and self-optimizing network (SON) use cases and solutions".

Once base stations (or one or more cells thereof) have been deactivated, at some point in time these base stations (or cells) may have to be reactivated again. Thus, a decision is required when and/or which base stations or cells need to be activated.

A first solution would be to activate the base stations or cells at a predetermined time. As an example, it can be imagined that fewer base stations need to be active during night time and more base stations need to be active during the day.

Another solution would be to activate all inactive cells adjacent to (i.e. relevant for) a currently active cell when the currently active cell detects a certain traffic load exceeding a threshold or detects a rising traffic load.

There is a need in the art to improve these solutions by determining more accurately which base stations and/or cells should be activated.

SUMMARY OF THE INVENTION

A method for activating at least one inactive cell in a wireless telecommunications infrastructure is disclosed. The telecommunications infrastructure comprises an active cell containing a plurality of terminals. A presence signal is transmitted in the at least one inactive cell. The plurality of terminals in the active cell (which are not necessarily all terminals in the active cell) detect the presence signal(s) of the one or more inactive cells to gather information about the inactive cell. The information is reported to and received at the telecommunications infrastructure. The information received from the plurality of terminals is processed in a processing system of the telecommunications infrastructure to provide a processing result. It should be appreciated that the information contained in some reports from some terminals need not necessarily be processed. The inactive cell is activated when the processing result fulfils at least one activation condition such that at least one of the plurality of terminals is within a coverage area of the activated cell.

Capabilities of terminals to gather information about a cell (e.g. to measure a signal transmitted by a cell) and to report such information are known in the art, for example to gather information about a neighbour cell in order to consider a handover to a neighbour cell. Examples for LTE include measuring and reporting Reference Signal Received Power (RSRP) and Reference Signal Received Quality (RSRQ). Also see 3GPP TS 37.320 "Radio measurement collection for Minimization of Drive Tests (MDT)". Examples for UMTS include measuring and reporting Received Signal Code Power (RSCP) and a quantity indicated as Ec/Io. For other technologies comparable quantities have been defined.

Processing information received from terminals may also include combining the received information with other information available to the infrastructure, such as the number of (failed) handover requests to an inactive cell, the number of (rejected) session requests from terminals trying to connect to an inactive cell, the positions of (some of) the terminals, the current load in an active cell, history or statistics of the history of the load in a cell, the location of a cell and the typical coverage area of a cell when active.

Receiving and processing information may continue e.g. until an activation condition has been fulfilled, or until a predetermined time has elapsed (e.g. since commencing to transmit a presence signal in an inactive cell) while an activation condition is not fulfilled, or until substantially no more additional information is received in relation to the transmission of a presence signal while an activation condition is not fulfilled. It should be appreciated that gathering adequate information about an inactive cell transmitting a presence signal may take some time, depending for example on how quickly a terminal may be informed about the measurements to be performed, on the type and duration of measurements to be performed (which may include performing signal strength and/or signal quality measurements on an inactive cell's presence signal, performing handover evaluations, cell reselections and location area updates), on the way a terminal is able to perform the requested functions, on the complexity and number of reports a terminal may prepare, on the way the telecommunication infrastructure may receive the reports, on the type and number of reports and/or events to be received, on the fraction of the reports that include location information and on the accuracy of the location information, etc. The time period from commencing to transmit a presence signal in an inactive cell to the moment a decision is taken on whether or not to activate the inactive cell may be referred to as a 'probing period'.

Fulfilling an activation condition may be that the processing result indicates, for example, that the number of terminals which are estimated to be in the best server area of an inactive cell, when activated, is above a predetermined number of terminals or is above a predetermined fraction of the terminals currently served by one or more active cells, or that the load (expressed e.g. in the number of calls or in an aggregated bit rate or in another load measure) that is estimated to be absorbed by an inactive cell, when activated, is above a predetermined load measure.

A computer program containing software code portions (possibly distributed over several components in the telecommunications infrastructure) for performing the method when executed by a processing system is also disclosed.

A wireless access telecommunications infrastructure comprising an active cell and at least one inactive cell is also disclosed. The active cell can contain a plurality of terminals is also disclosed. The infrastructure comprises a presence signal generator configured for generating a presence signal to be transmitted in the at least one inactive cell. The infrastructure further comprises a receiver configured for receiving reports from the plurality of terminals detecting the presence signal and a processor system configured for processing information contained in the reports received from the plurality of terminals to provide a processing result. The processing system may be part of the telecommunications infrastructure or be (partly) connected to the telecommunications infrastructure in which case the processing system is considered part of the telecommunications infrastructure. The infrastructure further comprises an activator configured for activating the inactive cell when the processing result fulfils at least one activation condition such that at least one of the plurality of terminals is within a coverage area of the activated cell. By using the (partly) existing capabilities of terminals to measure and report information received from neighbouring cells (typically applied for e.g. handover operations), the transmission of the presence signal in the currently inactive cell enables the telecommunications infrastructure to assess whether the terminals recognize this cell as an appropriate target, i.e. whether the terminals currently connected to or camping on the active cell are likely able to be connected to or camp on a currently inactive cell. The telecommunications infrastructure is configured to receive and process the information relating to the inactive cell(s) from the reports of various terminals within the active cell (possibly, but not necessarily, all terminals in the active cell). The reported information, possibly combined with other information available to the infrastructure, forms the basis to decide whether or not to actually activate the currently inactive cell (i.e. to change the network configuration of the telecommunications infrastructure) in order for the terminal to connect to or camp on the activated cell via a handover operation or cell reselection, respectively.

The information can be used by an energy evaluation algorithm for determining whether energy consumption of the telecommunications infrastructure can be reduced or used in an efficient manner, e.g. by efficiently controlling activation of cells in the telecommunications infrastructure if required.

The method and telecommunications infrastructure may, in addition or alternatively, also be applied for other purposes. As an example, similar considerations apply to the reduction of electromagnetic radiation produced by a base station. For example, for health reasons it is advisable to limit the amount and duration of electromagnetic radiation to a level that is strictly necessary for the operation of the base station. When the level of electromagnetic radiation can be reduced or when a base station can be switched off, this may be well-appreciated by the population in the vicinity of the base station. Considerations may either apply to the complete telecommunications infrastructure or to a part of the infrastructure, e.g. for a plurality of cells. For example, heavily populated areas may be selected to have low electromagnetic radiation density, whereas in less densely populated areas, the electromagnetic radiation levels can be higher. In addition to health concerns, there may also be technical reasons to restrict the electromagnetic radiation, and therewith the possibility and level of interference experienced in adjacent areas.

It should be appreciated that the active cell and inactive cell may relate to any type of radio access technology (RAT) including, but not limited to GSM, UMTS, LTE, Wimax etc.

It should further be appreciated that the measurements for information on the inactive cell(s) of terminals in the active cell may relate to a single radio access technology (intra-RAT) or multiple different radio access technologies (inter-RAT). An example of inter-RAT includes a terminal in an active UMTS cell performing measurements on an inactive GSM cell.

The method and telecommunications infrastructure also allow taking account of the distribution of terminals in the active cell. For example, if the analysis reveals that a considerable number of terminals served by the active cell finds themselves near the edge of the active cell (i.e. the reported measurement information indicates a high signal level or signal quality for the presence signal of neighbouring inactive cells and much lower levels for the active cell for a considerable number of terminals), the total energy for the telecommunications infrastructure may be reduced by activating one or more inactive cells and hand over these terminals to these cells.

In the present application, an active cell is considered a cell enabling connection of a terminal to the base station responsible for the cell. In other words, the cell is fully operational.

An inactive cell is considered a cell that is not intended to carry any voice or data traffic but may transmit a presence signal during particular time intervals or continuously. A presence signal may comprise a beacon signal, such as BCCH in GSM network, CPICH in UMTS network or reference symbols in LTE in order to indicate the presence of the cell. In addition, the inactive cell may at least transmit some system information (e.g. cell identity, power level of its beacon signal, etc.), for example on a broadcast signal (BCH) containing system information blocks (MIB, SIB, etc.), depending on its level of functionality. A presence signal may also include a synchronization channel (SCH), commonly used in mobile communication systems such as GSM, UMTS and LTE, for cell search, for identifying a cell and for synchronization with a cell. An inactive cell may, during a probing period transmit a presence signal, for example reference symbols in LTE or CPICH in UMTS, synchronisation signal (SCH) and broadcast signal (BCH) containing system information blocks (MIB, SIB, etc) while not accepting any 'normal' traffic, such as voice or data connections.

The inactive cell can become an active cell by applying the method disclosed herein. The inactive cell may be an inactive cell because it does not accept handover for active terminals to the inactive cell or because it redirects connections to an active cell once a connection is requested from a terminal in the inactive cell. Such methods are known in the art and may for example be realised by settings a call admission control function (CAC) to block any handover request or any request for setting up a new session.

The main purpose of the inactive cells to transmit the presence signal is to allow the terminals in the active cell to perform measurements on these inactive cells and to report such measurements to the network. Terminals in the active cell can be distinguished between terminals in the active mode (active terminals) and terminals in the idle mode (idle terminals). A terminal with an active connection (e.g. a voice call or data being exchanged) is said to be in 'active mode' or 'connected mode'. When the terminal is in active mode (active terminal), the network has detailed knowledge about the terminal and knows by which cell it is served. A terminal which is powered on but without an active connection is said to be in 'idle mode'. When the terminal is in idle mode (idle terminal), the network has limited knowledge about the mobile station and only knows in which paging or location area the terminal may be paged. In idle mode the terminal listens to e.g. a broadcast channel or a paging channel of a particular cell. It is said that the terminal 'camps on' that cell. Consequently, a decision as to activate an inactive cell (or which active cell(s) from a set of inactive cells) can thus be based on information gathered from terminals in different states, i.e. from active terminals (terminals which have an active connection with the network for conveying traffic) and possibly from idle terminals (terminals which do not have an active connection with the network).

As a first example, a decision to activate an inactive cell may be based on the information gathered only from active terminals, for example by one or more of the following:

1. Counting requests for handover from active terminals with the inactive cell as target/destination.

2. Receiving and processing reported measurements from active terminals, e.g. signal strength and/or quality of the presence signal transmitted in an inactive cell, location information (e.g. determined by GPS or by the mobile network), etc.

3. Counting requests for a new session from active terminals that attempted to set up a connection with the inactive cell (and were refused and/or redirected towards an active cell because the inactive cell does not accept 'normal' traffic).

4. Any other measurements by active terminals that would be useful in deciding whether or not to activate an inactive cell.

As a second example, a decision to activate an inactive cell may be based on the information gathered both from active terminals and from idle terminals. In addition to the possibilities listed above for active terminals, from the idle terminals one or more of the following could be used:

1. Counting events of cell reselection by an idle terminal from an active cell to an inactive cell. This may in particular be relevant to an inter-RAT case. For example, an idle terminal that was originally camped on an active cell reselects to an inactive cell and then camps on the inactive cell.

2. Counting events of a location area update (e.g. as a result of a cell reselection).

3. Receiving an processing measurements performed by idle terminals, e.g. about signal strength and/or quality of the presence signal transmitted in an inactive cell, location information (e.g. determined by GPS or by the mobile network), etc.

4. Any other measurements by idle terminals that would be useful in deciding whether or not to activate an inactive cell.

As a third example, a decision to activate an inactive cell may be based on the information gathered only from idle terminals. However, this is not preferred, because the information from currently active terminals is considered to be highly relevant and relatively easy to obtain.

As indicate above, an inactive cell is considered a cell that is not intended to carry any voice or data traffic but may transmit a presence signal. That leaves a whole spectrum of additional capabilities which may or may not be available in an inactive cell while transmitting a presence signal during a probing period. Two examples will be provided towards the ends of that spectrum; a first example of an inactive cell with close to full functionality and a second example of an inactive cell with close to minimum functionality. It may be noted that the functionality of an inactive cell also has some impact on the role the inactive cell may have in gathering information about the inactive cell.

A first example of an inactive cell is a cell which does not accept any 'normal' data or voice traffic from a terminal (realised, for example, by proper settings of the connection admission function, which blocks any handover towards the or session set-up to the inactive cell) but is otherwise close to fully functional. For example, the Tx and Rx chains may be fully functional, the interfacing with the core network (in LTE the for example X2 or S1 interface, in UMTS for example the Iub interface with the RNC) may be activated, etc. Consequently, the inactive cell may be able to receive measurement reports from active and/or idle terminals, may be able to process or forward these reports, may be able to receive location area updates from idle terminals, etc. Also, requests for handover towards the inactive cell and requests for setting up a session to the inactive cell may be received and properly responded to, i.e. be refused or redirected towards an active cell. It is expected that with a close to full functionality during a probing period, a noticeable energy consumption is unavoidable but that still a major energy saving is achieved by not allowing 'normal' data or voice traffic.

A second example of an inactive cell is a cell which only performs close to the minimum of functions, i.e. the transmission of a presence signal. For example, only the downlink signalling (such as pilot channel/reference symbol, SCH, BCH, etc.) are active to indicate the presence and the identity of the inactive cell and to allow the terminals to perform measurements on the presence signal of the inactive cell. The inactive cell may be configured to not receive any signalling messages (e.g. related to handover, to session set-up, to location area updates, to measurement reports, etc.) during the probing interval. Communication with the core network may likewise be restricted to, for example, receiving management commands related to the transmission of the presence signal (including any associated information), to the activation of the inactive cell and to transmitting some status information. It is expected that with a close to minimum functionality during a probing period, a very high energy saving is achieved.

Between the ends of the spectrum a trade-off may be made between the energy consumption and the functionality provided by (and associated therewith the ease of information gathering) an inactive cell during its probing period.

The method for assessing whether activation of the inactive cell is possible or required can be performed during subsequent time intervals (e.g. periodic time intervals) in order to not bother the terminals (battery saving) and the network (reduction of network load) continuously. However, (semi-) continuous performance of the method when one or more cells are currently inactive may be an attractive alternative for rapid assessment of opportunities to change the configuration of the telecommunications infrastructure.

In an embodiment of the invention, the terminals may be provided with measurement and/or reporting parameters in order to control measurement and reporting operations by the terminals in the active cell. The parameters may e.g. be provided over a connection via the active cell to a terminal that is in the active mode or broadcasted in the active cells to terminals in the active or idle mode. The measurement parameters trigger terminals to perform measurements. The reporting parameters instruct terminals (when) to report measurements to the network.

In existing wireless access telecommunications networks, terminals usually already perform measurements in certain conditions and may report measurement results in certain other conditions. For example, active terminals in handover regions between adjacent cells usually already report measurement information from the adjacent cells to the network in order for the network to perform a handover decision for each individual terminal. The measurement parameters provided to the terminals not only allow to obtain measurement information from active terminals in the handover region but also allow to obtain information about neighbour inactive cells from active terminals outside the handover region and from idle terminals within the active cell. These terminals may report that information to the telecommunications infrastructure.

As a first example, a reporting threshold usually applied in the terminal to prevent reporting measurements about neighbour signals with a signal level which is insufficient compared to the signal from the serving cell to be relevant for a possible handover may be adjusted temporarily to allow also reporting signal levels which would otherwise be considered insufficient. As a second example, a signal level threshold usually applied in the idle terminals to prevent performing measurements on neighbour cells when the signal level from the serving cell is more than adequate, may be adjusted (e.g. increased) temporarily to allow measurements on neighbour cells. Providing the measurement and/or reporting parameters to the terminals in the active cell enables more terminals and enables terminals at more locations in the active cell (e.g. not only in what would normally be considered the handover region between two cells) to perform measurements and/or to provide reports to the network.

The telecommunications infrastructure may comprise several inactive cells that may concurrently or sequentially transmit the presence signal, enabling the terminals to measure signals from a plurality of cells concurrently or sequentially to allow the network to obtain a more complete picture of the possibilities for a network configuration change. The inactive cells may be located in the active cells (e.g. micro cells), may be adjacent to the active cell or may be located further away from the active cell. The plurality of inactive cells may have an aggregated estimated coverage area that at least partially overlaps the coverage area of the active cell.

Concurrent transmission of a presence signal by several inactive cells may be time efficient and may provide a slightly different picture of the network situation. For example, in a situation with overlapping inactive cells, a sequential transmission of the presence signal could indicate that a particular user device would select more than one inactive cell if only a single of these inactive cells would be activated, whereas concurrent transmission of the presence signal would indicate which of these inactive cells the same user device would select if all these inactive cells would be activated. Sequential transmission of a presence signal may be work load efficient as it allows to refrain from completing the entire envisaged sequence, for example if the thus far collected information appears to be satisfactory. Sequential transmission of a presence signal may involve the sequential transmission in groups of inactive cells to assess the best combination. The sequential variant may use history information to first transmit a presence signal in inactive cells that previously turned out successful candidates for activation.

In an embodiment, a reporting identifier is transmitted in the inactive cell. The present application also discloses a signal transmitted in a cell of the infrastructure, wherein the signal comprises the reporting identifier.

Active terminals in the active cell may receive the reporting identifier and transmit the reporting identifier with the report in order to enable the telecommunications infrastructure to distinguish between reports from terminals related to normal handover (to an active cell) and reports from terminals reporting information about the inactive cells for assessing whether the inactive cell should be activated.

Idle terminals detecting the reporting identifier from the inactive cell may be configured to use this identifier to prevent cell reselection by the idle terminal to the inactive cell, to report the information about the inactive cell to the telecommunications infrastructure via the active cell before reselection to the inactive cell, or to report information about the inactive cell to the inactive cell when the inactive cell is configured to receive such reports.

One embodiment is advantageous for the reason that the number of idle terminals is normally much greater than the number of active terminals. Having a plurality of idle terminals reporting information on the presence signal(s) from the inactive cell(s) may greatly contribute to the complete picture of opportunities for reconfiguration of the telecommunications infrastructure and also may indicate possible traffic load in the near future. For the idle terminals to transmit reports to the telecommunications infrastructure, these terminals should temporarily become active.

Apart from the mechanism for idle terminals described above, other embodiments provide several other mechanisms for participation of idle terminals in the method according to the invention. These embodiments are described in further detail in the detailed description.

Briefly, one embodiment comprises temporarily decreasing a location area update period (or a similar period) in at least one of the active cell and the inactive cell. The embodiment is advantageous as it may require no or only few modifications to currently existing networks.

Another embodiment comprises the idle terminals to report measurement information to the telecommunications infrastructure via the active cell, whereas these terminals would otherwise reselect to the inactive cell and attempt reporting to the inactive cell. This embodiment allows the inactive cells to maintain a status wherein these cells are not able or are configured not to be able to receive reports.

A further embodiment comprises transmitting a paging message in the active cell instructing the idle terminals to obtain and/or report the information. The idle terminals listen to broadcast and paging channels and can be triggered to detect information from inactive cells using these channels. Using such paging message, less need exists to temporarily reconfigure the system information of the active cell different from the normal operation. This is particularly true if the paging messages carry configuration parameters for the idle terminals, such as the measurement and/or reporting parameters.

Some embodiments require modifications to the processing capabilities of currently existing wireless terminals. The present application discloses a wireless terminal for use in these embodiments.

Hereinafter, embodiments of the invention will be described in further detail. It should be appreciated, however, that these embodiments may not be construed as limiting the scope of protection for the present invention.

DETAILED DESCRIPTION OF THE INVENTION

Figure 1A:
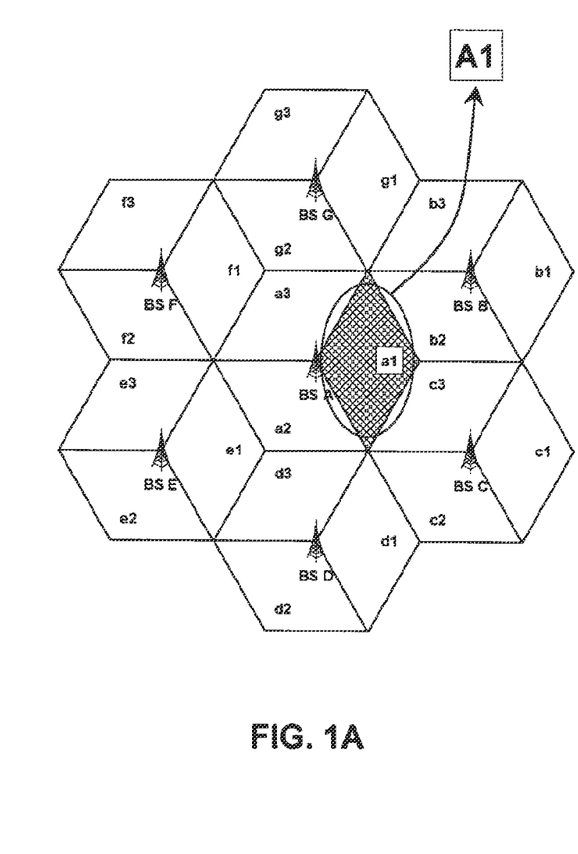
FIGS. 1A and 1B are schematic illustrations of base stations in a wireless access telecommunications infrastructure providing active cells and inactive cells.

FIG. 1A is a schematic illustration of base stations BS A-BS G in a wireless access telecommunications infrastructure providing a plurality of active cells. Each base station location comprises three sectors, thus covering an area around the base station location. For example, cell A1 of base station location BS A serves its best server area marked 'a1'. Similarly, cell A2 and A3 of the same location serve their best server area marked 'a2' and 'a3' respectively. A same set-up is shown for the other base station locations BS B to BS G. In FIG. 1A, the regular pattern of base stations and sectors leads to the commonly known hexagonal pattern of coverage areas.

Figure 1B:
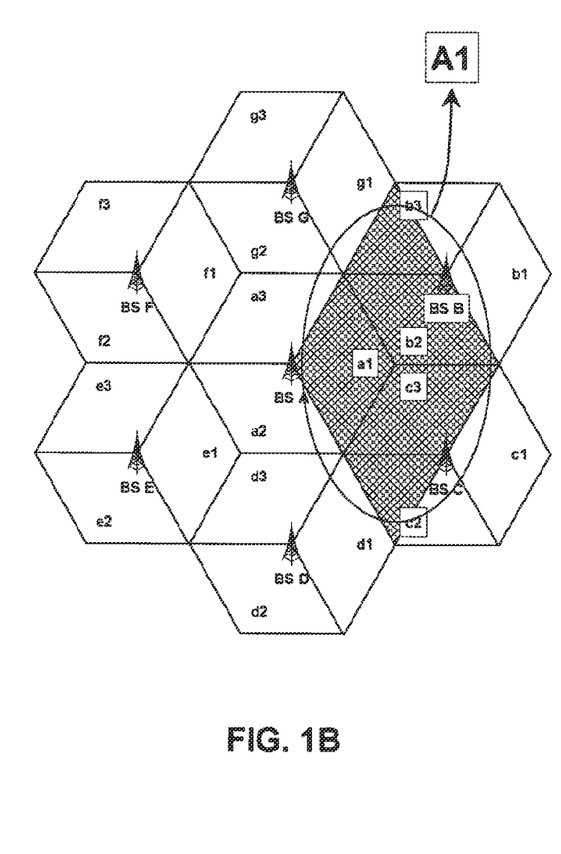

FIG. 1B shows the same areas in a light grey colour. For example for energy saving reasons, some cells at base station locations B and C have been switched off and cell A1, together with some other cells (not shown) now provides service to some of BS B and BS C's best server areas. In FIG. 1B, a darker gray shading illustrates that cell A1 provides service not only in its 'own' or 'native' area a1, but also in areas b2 and c3 and in part of the areas b3 and c2. Other cells may similarly have been switched off and service in their ('native') areas may be provided by one or more of the surrounding cells.

Figure 2:
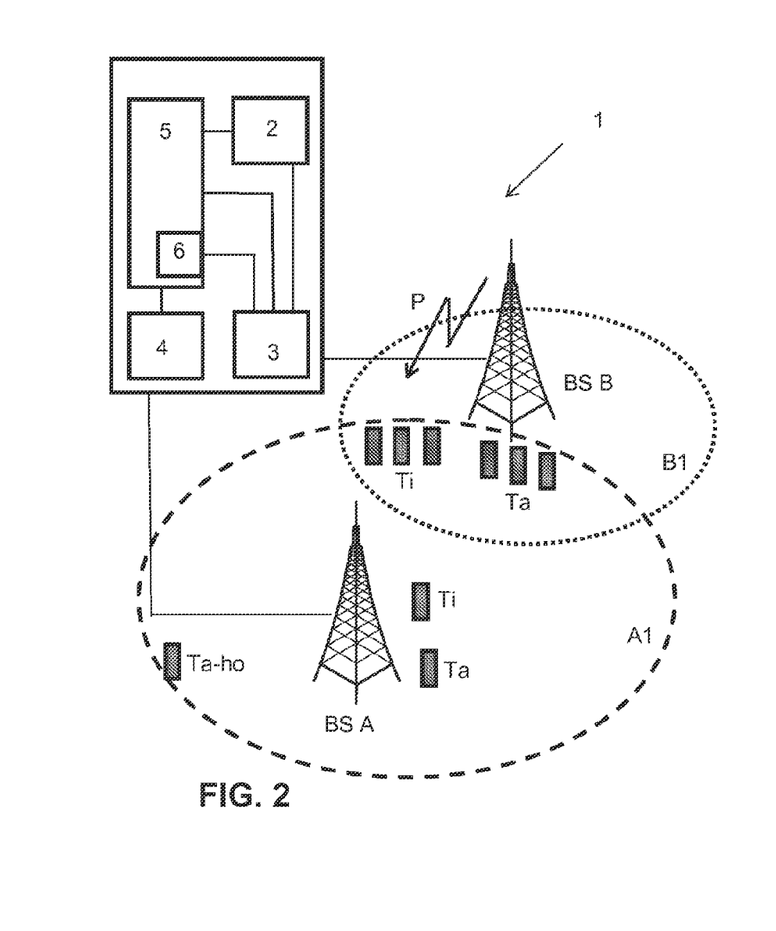
FIG. 2 is a schematic illustration of a telecommunications infrastructure comprising a base station defining an active cell containing a plurality of terminals and a base station providing an inactive cell transmitting a presence signal.

FIG. 2 is a schematic illustration of a wireless access telecommunications infrastructure 1 comprising a base station BS A defining an active cell A1 containing a plurality of active terminals Ta and idle terminals Ti. Base station BS B provides an inactive cell B1 wherein it transmits a presence signal P.

Telecommunications infrastructure 1 comprises a presence signal generator 2 for generating the presence signal P via interface 3. The telecommunications infrastructure 1 further comprises a receiver 4 configured for receiving reports from the plurality of terminals Ta, Ti detecting the presence signal P. A processor system 5 is configured for processing information contained in the reports received from the plurality of terminals Ta, Ti to provide a processing result. The processor system 5 has an activation module 6 configured for activating the inactive cell of BS B when the processing result fulfils at least one activation condition such that at least one of the plurality of terminals Ta, Ti is within a coverage area of the activated cell B1 of base station BS B.

Figure 3:
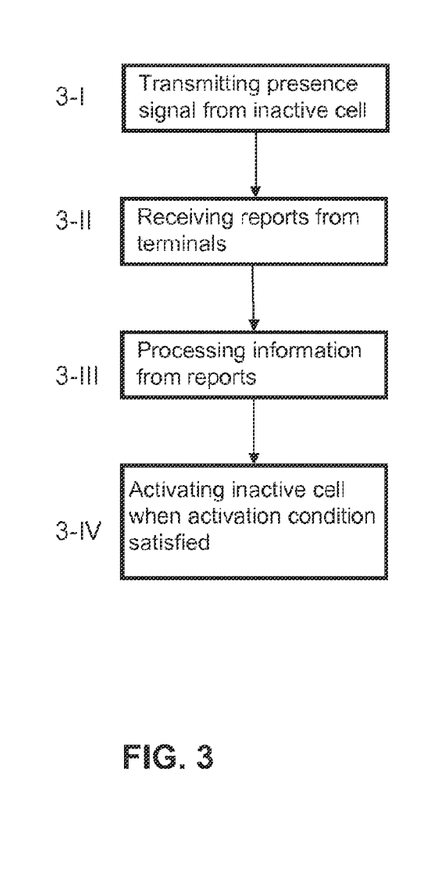
FIG. 3 is a flow chart illustrating various steps of a method according to an embodiment of the invention.

Various events may trigger the telecommunications system 1 to operate the method as illustrated in the flow chart of FIG. 3. The method may be performed periodically or continuously, wherein generator 2 periodically or continuously generates the presence signal P in inactive cell B1. In at least some situations, it is advantageous to transmit the presence signal P concurrently by several related cells (rather than transmitting the presence signal P for separate cells, e.g. one-by-one). For example, in FIG. 1B, it may be advantageous to perform the method and evaluation concurrently for cells B3, B2, C3 and C2. A same or similar advantage may apply to cells which otherwise provide mutual coverage or are in close proximity of each other. Alternatively or in addition, the transmission of the presence signal P may be initiated by a predetermined condition in an active cell A1 verified by processing system 5, e.g. a traffic load exceeding a threshold or a traffic load showing a substantial increase.

The method as illustrated in the flow chart of FIG. 3 may be performed as follows. In step 3-I, a presence signal P is generated by generator 2 and transmitted in the at least one inactive cell of base station BS B. The plurality of terminals Ta, Ti in the active cell A1 (which are not necessarily all terminals in the active cell) detect and measure the presence signal P of the inactive cell B1 and gather information about the inactive cell (e.g. signal level/quality of presence signal P and cell identity of inactive cell B1). The information is reported to and received at the telecommunications network via the active cell A1 and receiver 4 (step 3-II). Alternatively, some of the information, in particular from idle terminals Ti, may be also reported via inactive cells, presuming these are configured for at least receiving such reports. The information received from the plurality of terminals Ta, Ti is processed in processing system 5 to provide a processing result (step 3-III). It should be appreciated that the information contained in some reports from some terminals need not be processed by processing system 5 and that processing system 5 may use additional information not received from the terminals (e.g. information typically available from a management system such as the location and configuration of the base stations etc.). The inactive cell B1 is activated in step 3-IV when the processing result fulfils at least one activation condition such that at least one of the plurality of terminals Ta, Ti is within a coverage area of the activated cell B1.

Figure 4:
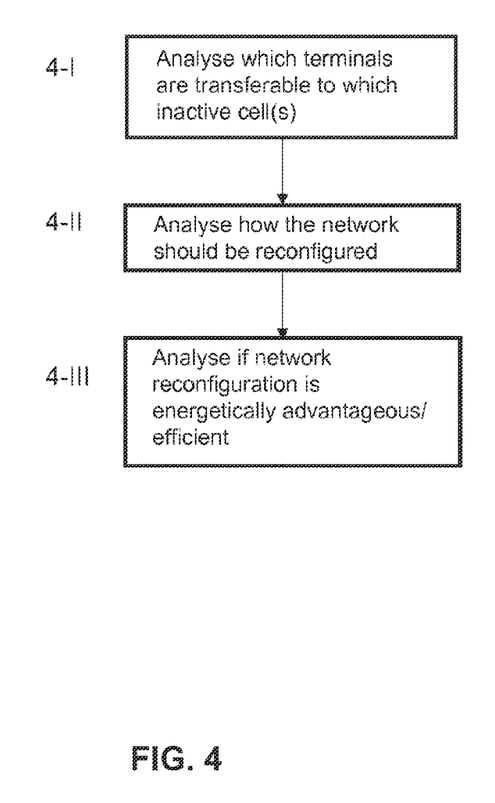
FIG. 4 is a flow chart illustrating the information processing step in further detail.

FIG. 4 shows a flow chart exemplifying some steps of processing step 3-III in further detail. The telecommunications infrastructure 1 allows to take account of the distribution of terminals Ta and Ti in the active cell A1. The information obtained from the terminals Ta (such as measured signal level/quality or path loss) can be applied for energy reduction purposes. For example, if the analysis (e.g. based on the reported signal level measurements) reveals that a considerable number of active terminals Ta served by the active cell A1 finds themselves near the edge of the active cell A1 as shown in FIG. 2 and is transferable to inactive cell B1 (step 4-I), a reconfiguration of the network can be analysed (step 4-II) wherein the inactive cell B1 is activated (step 4-II). The activation condition wherein the total energy for the telecommunications infrastructure 1 can be reduced (step 4-III) may be fulfilled since the power reduction estimated to be obtained by transferring these terminals away from active cell A1 may be more than the power estimated to be required for an activated cell B1 and for serving these terminals by cell B1.

The analysis as depicted in FIG. 4 may also be used for increasing the energy consumption of the telecommunications network in an efficient manner. As an example, if the load in active cell A1 increases, at some point in time additional cells need to be activated. Reports from the active terminals Ta may indicate (e.g. from the signal levels/signal quality reported about the presence signal P of cell B1) that cell B1 is a suitable candidate for activation.

As an alternative or in addition, triggered reports from idle terminals Ti may be considered in the decision which cell is most suitably reactivated to alleviate the effects of the local traffic overload. Note that the number of idle terminals in a cell is usually much larger than the number of active terminals. Reports from such idle terminal typically indicate the best cell as selected by each triggered idle terminal, choosing from both active and inactive cells that transmit a presence signal P. Counting for each inactive cell transmitting presence signal P how many idle terminals Ti (optionally: how many idle terminals that currently camp on the overloaded active cell) would prefer that inactive cell, provides an indication of the near-future traffic load that can be absorbed by the inactive cell when fully reactivated, thus relaxing the currently overloaded active cell from that (potential) 'burden'. Instead or along with the information on the active terminals Ta, the information on the idle terminals Ti can be considered in the decision process regarding which inactive cell to activate.

Several methods of triggering active user terminals Ta and idle terminals Ti to obtain information on the inactive cell(s) and to report this information will now be discussed in further detail.

Generally, the terminals may be provided with measurement and/or reporting parameters in order to control measurement and reporting operations by the terminals in the active cell A1. The parameters may e.g. be provided over a connection via the active cell to an active terminal Ta or broadcasted in the active cell A1 to active and idle terminals Ta, Ti using e.g. system information blocks SIB.

An active terminal Ta receives instructions from the network about which measurements to perform and which events to report to the network (e.g. the event that a neighbour inactive cell B1 is detected with a signal strength/quality that is better by xdB than that of the currently serving active cell A1). When a measurement leads to one of the specified events, the terminal Ta reports the relevant information (e.g. an identification of the detected neighbour inactive cell B1, its measured present signal level/quality and the measured signal level/quality of the active cell A1) over the existing connection to the telecommunications infrastructure 1. Either in response to a report from a terminal Ta or autonomously, the telecommunications infrastructure 1 may instruct the terminal Ta to perform additional measurements of a same or different kind and to report the results.

Base station BS B may transmit a reporting identifier, hereinafter also referred to as 'probing flag', in the inactive cell B1. Active terminals Ta in the active cell A1 may receive the reporting identifier and transmit the reporting identifier with the report containing information regarding inactive cell B1. The active terminal Ta is thus configured to recognize the reporting identifier and to include this reporting identifier in the report containing the information on the inactive cell B1. This facilitates the processing system 5 of telecommunications infrastructure 1 to more easily distinguish between terminals Ta-ho (see FIG. 2) reporting in the context of a normal handover to another active cell (not shown in FIG. 2) and terminals Ta reporting information from the inactive cell B for assessing whether the inactive cell should be activated. An alternative for enabling the telecommunications infrastructure 1 to distinguish between reports relating to normal handovers and reports to be analyzed towards a decision whether to activate an inactive cell is to inform the base station BS A (or at least the associated entity normally handling the handover-related reports) of the identity of the inactive cells transmitting presence signals, such that reports related to an identity of an inactive cell can be excluded from being processed towards a handover decision and can be forwarded to processing system 5.

In order for idle terminals in active cell A1 to be triggered to obtain information about inactive neighbour cell B1, various parameters may be broadcasted in the active cell A1 in the system information block SIB for cell reselection. One example of such a parameter is an absolute signal level threshold Ts,search. This threshold is used by idle terminals as a reference for the received signal level Srxlev, measured by the terminals, from the active cell A1 and to decide if neighbour measurements for cell reselection are needed. Different values might be assigned to Ts,search for the measurement of intra-frequency, inter-frequency and inter-RAT neighbours. If Srxlev<Ts,search, the terminal will search for corresponding (intra-frequency, inter-frequency or inter-RAT) neighbour cells and measure the received signal level Nrxlev and/or Nqual. Nrxlev is the received signal level of the presence signal from a neighbour cell, e.g. from the inactive cell B1. Nqual is the received signal quality from a neighbour cell, e.g. from inactive cell B1 (e.g. $E_c/I_0$ of the CPICH for UMTS cells or RSRQ of the reference symbols for LTE cells). Hysteresis parameter Qhyst for the active cell A1 and offset parameters Qoffset,n to be applied to each neighbour n specifically, can also be broadcasted in the active cell A1.

Next, exemplary methods will be discussed for instructing idle terminals Ti to perform measurements on inactive cells and to report this information to the telecommunications infrastructure 1.

Figure 5:
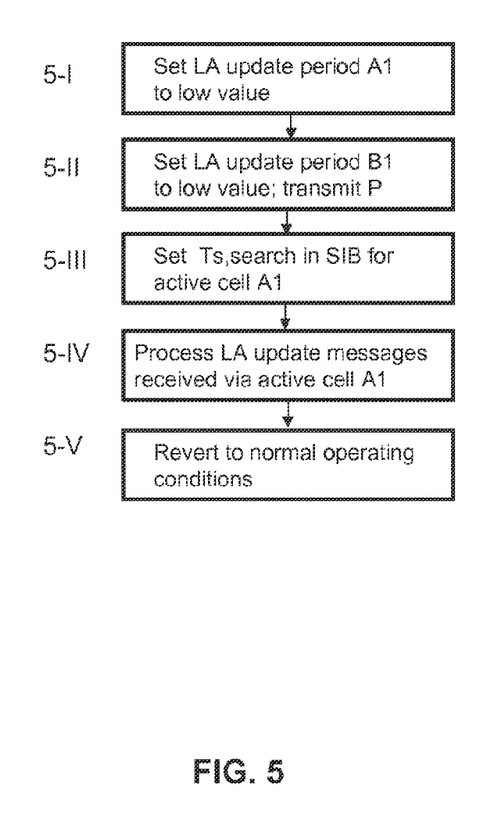
FIGS. 5-8 are flow chart illustrating steps of a method for participation of idle terminals and FIG. 9 is a schematic illustration of a wireless terminal configured for being operable in the telecommunication infrastructure of FIG. 2.

In a first method, illustrated in the flow chart of FIG. 5, a location area update period (or a similar period) is decreased in the active cell A1 and the inactive cell B1. The embodiment is advantageous as it requires no modifications to currently existing networks.

In the active cell A1, in the system information (SIB) to be broadcast on the broadcast channel of the active cell A1, a relatively short value (e.g. 30 s, 1 min) is set for the periodic location area (LA) update (instead of a nominal value, e.g. 30 min, 1 hour, infinite). This is illustrated in step 5-I. A paging message may be issued in the cell A1 indicating modified system information. This paging message is also received by idle terminals camping on the active cell A1.

As a consequence, an idle terminal Ti camping on the active cell A1 reads the modified SIB and starts providing frequent (e.g. every 30 s, 1 min) periodic LA updates. An LA Update message also includes information about the identity of the terminal. The telecommunications infrastructure 1

(more particularly processing system 5) receives the LA Update messages and may derive (e.g. every 30 s, 1 min) how many and which terminals Ti are currently camping on the active cell A1. This provides information about the initial situation regarding idle terminals in the active cell.

In step 5-II, the inactive cell(s) B1 set a periodic LA update value to a similarly short (e.g. 30 s, 1 min) value as used for the active cell A1. The presence signal P is transmitted in the inactive cell B1.

In the active cell A1, in the system information (SIB) to be broadcast on the broadcast channel of the cell, the absolute signal level threshold parameter Ts,search is set higher than nominal (e.g. nominal value+[5,10] dBm), step 5-III. This parameter controls the conditions when an idle terminal Ti searches for neighbour cells B1. In the cell, a paging message may be issued indicating modified system information. This paging message is also received by idle terminals camping on the active cell A1. It should be appreciated that for some RATs (e.g. UMTS) an idle terminal Ti will execute the cell reselection evaluation process when triggered by a modification of the information on the BCCH used for the cell reselection evaluation procedure (i.e. when this particular SIB is modified).

As a consequence, an idle terminal Ti for which the received signal level of the active cell A1 is below the adjusted (increased) threshold Ts,search measures the neighbour cells, for example including inactive neighbour B1. For some RATs (e.g. UMTS) a terminal will perform such measurements regardless the setting of Ts,search.

An idle terminal Ti for which the specified conditions are satisfied performs cell reselection. The condition for cell reselection may be based on ranking the active cell A1 (based on Srxlev or Squal and adding Qhyst) and all (inactive and active) neighbour cells (based on Nrxlev or Nqual and adding neighbour-specific Qoffset,n). If the highest-ranked cell is not the active cell A1, then the idle terminal Ti will make the cell reselection to the highest-ranked cell. The ranking mechanism may be dependent on the radio access technologies of the involved cells and possibly also on other conditions like environment characteristics. In the existing art it is for instance known that cell reselection in a network consisting of cells with different radio access technologies may be organised in a 2-step manner: For instance in a network consisting of both UMTS (UTRAN) and GSM (GERAN) cells, first a ranking based on received signal level (Srxlev for the serving cell and Nrxlev for the neighbour cells) may be performed, taking account of corresponding Qhyst and Qoffset,n (noted as Qhyst(1) and Qoffset,n (1)). If the highest ranked cell is a GSM cell, the terminal will reselect to this cell. However, for the ranking of the UMTS cells, received signal quality (e.g. $E_c/I_0$) is a better indicator of the suitability of a cell for cell reselection. Therefore, if a UMTS cell is the highest ranked in the first step, a second step follows, in which the UMTS cells are ranked based on received signal quality, still taking Qhyst and Qoff-set,n (noted as Qhyst(2) and Qoffset,n(2)) into account. The terminal then reselects to the highest ranked UMTS cell in this second ranking.

Similarly, for different combinations of RATs different ranking methods may be devised.

It is also known from the existing art that differences in certain geographical environments may be used to select a ranking mechanism form a set of implemented ranking mechanisms.

The remainder of this text is based on applying the example of cell-ranking based on received signal level. It should however be understood that also other cell ranking mechanisms can be applied.

An idle terminal Ti persisting to camping on the active cell A1 continues providing frequent LA Updates messages to the active cell A1. An idle terminal Ti which has reselected to an inactive cell B1 (which is assumed to be configured for frequent LA Updates as indicated above) will provide its frequent LA Update messages to the relevant inactive cell B1. An idle terminal Ti which has reselected another active cell will adhere to the LA Update regime as broadcast by that cell (which may be a nominal value, e.g. 30 min, 1 hour, etc.)

After a transitional period (whose length may depend on the duration of the cell reselection procedure and the LA Update period), the processing system 5 may derive in step 5-IV from the received LA Update messages how many and which idle terminals remain camped on the active cell, how many and which idle terminals have reselected an inactive cell (and which cell) and how many and, possibly, which idle terminals have reselected from the active cell to other cells. This analysis provides an estimate about the situation regarding idle terminals Ti when each of the inactive cells B1 would be activated.

The information obtained from step 5-IV may be taken into account in the evaluation by the processing system 5 about which of the inactive cells should be activated and which of the inactive cells should not. The processing result can be analyzed against the at least one activation condition.

After sufficient information has been obtained in step 5-IV, in the active cell A1 the system information (SIBs) may be reverted to normal operating conditions. A paging message may be issued indicating modified system information. This paging message is also received by idle terminals still camping on the active cell A1. An idle terminal camped on the active cell will remain camped there.

Also, after the decision obtained from the processing of step 5-IV, in the inactive cells decided to be activated, the system information (SIBs) may be reverted to normal operating conditions. In these cells, a paging message may be issued indicating modified system information. This paging message is also received by idle terminals camping on any of the cells. An idle terminal camped on any of the activated cells will remain camped there.

A reset to normal operating conditions is indicated in step 5-V in FIG. 5 for both the active cell A1 and the activated cell B1.

Still further, after the decision obtained from the processing of step 5-IV, the inactive cells that are decided to be not activated may be switched off, i.e. the presence signal P is no longer transmitted in these cells. Idle terminals camped on such a cell will perform cell selection and find a suitable cell (possibly reselecting the active cell A1, possibly reselecting one of the activated neighbour cells B1, possibly reselecting another neighbour cell).

It should be appreciated that the need to issue a paging message in order to have idle terminals read modified system information is RAT dependent.

In a second method, illustrated in the flow chart of FIG. 6, a location area update period (or a similar period) is decreased in the active cell A1 and a reporting identifier, also referred to here below as probing flag, is broadcast in the inactive cell B1 during a time interval.

The first step, indicated by 6-I, is equivalent to step 5-I in FIG. 5.

Different from the first method, the LA update period is not changed in the inactive cells B1. A reporting identifier is transmitted in the inactive cells B1 (step 6-II). The presence signal P, possibly including the probing flag, is transmitted in the inactive cells B1.

In the active cell A1, the absolute signal level threshold parameter Ts,search is set higher than nominal (e.g. nominal value+[5,10] dBm) in step 6-III and is broadcasted in the system information (SIB) on the broadcast channel of the cell. This parameter controls the conditions when an idle terminal Ti searches for neighbour cells. A paging message may be issued indicating modified system information. This paging message is also received by idle terminals Ti camping on the cell. It should be appreciated that for some RATs (e.g. UMTS) an idle terminal Ti will execute the cell reselection evaluation process when triggered by a modification of the information on the BCCH used for the cell reselection evaluation procedure (i.e. when this particular SIB is modified).

As a consequence, an idle terminal Ti for which the absolute received signal level of the active cell A1 is below the adjusted threshold Ts,search measures the neighbours. For some RATs (e.g. UMTS) a terminal will perform such measurements regardless the setting of Ts,search.

An idle terminal Ti for which the specified conditions are satisfied performs cell reselection. The condition for cell reselection may be based on ranking the active cell A1 (based on Srxlev or Squal and adding Qhyst) and all (inactive and active) neighbour cells (based on Nrxlev or Nqual and adding neighbour-specific Qoffset,n). If the highest-ranked cell is not the active cell A1, then the idle terminal Ti will make the cell reselection to the highest-ranked cell.

An idle terminal Ti persisting to camping on the active cell A1 continues providing frequent LA Updates messages to the active cell A1. An idle terminal Ti which reselects to an inactive cell B1 (the terminal Ti may detect this from the probing flag in the inactive cell's broadcast channel) is configured to, shortly after performing the reselection, send a LA Update message to the selected inactive cell B1. This first LA Update message is sent, regardless the setting of the LA Update period in the inactive cell B1. An idle terminal reporting a cell reselection to an inactive neighbour cell may be further configured to also report the presence of the probing flag in its LA Update message. This could ease bookkeeping at the processing system 5 regarding the neighbour state (inactive or active).

Different from the first method, the inactive cells B1 are configured with a nominal period for LA Updates. Consequently an idle terminal camping on an inactive cell provides (subsequent to the first LA Update message sent shortly after camping on a cell with its probing flag set) only nominal LA Update messages (e.g. 30 min, 1 hour, etc.) to the cell. An idle terminal Ti which has reselected another active cell will adhere to the LA Update regime as broadcast by that cell (which may be a nominal value, e.g. 30 min, 1 hour, etc.).

After of transitional period (whose length may depend on the duration of the cell reselection procedure and the selected LA Update period in the cell A1), the telecommunications infrastructure 1 (more specifically, the processing system 5) may derive from the received LA Update messages how many and which idle terminals remain camped on the active cell A1, how many and which idle terminals have reselected an inactive cell (and which inactive cell) and, possibly, how many and which idle terminals have reselected from the active cell A1 to other cells. This provides an estimate about the situation regarding idle terminals when each of the inactive cells B1 will be activated (step 6-IV).

It should be noted that in the second method, the LA area update messages used to obtain the processing result are reported to the inactive cell B1 (and then via interface 3 to processing system 5, see FIG. 2).

In order to decrease the burden on the inactive cell B1, a first alternative would be to configure the idle terminal Ti (see FIG. 9) as follows. An idle terminal Ti which, in the procedure of ranking cells for cell reselection, detects the highest-ranking cell (best cell) to have its probing flag set, does not perform cell reselection to that cell as long as it has its probing flag set; it sends a report (comprising an indication of the terminal identity and of the best cell identity) to the cell it currently camps on (see the box beside 6-IV in FIG. 6). Different from the first method illustrated in FIG. 5, and different from the second method's basis described above, terminals Ti will send their reports via active cell A1, instead of via inactive cell B1. Thus, an inactive cell in this first alternative needs not to support reception of LA Update messages as described above. Also different from the first method illustrated in FIG. 5, an idle terminal Ti in this first alternative of the second method does not reselect to an inactive cell (comparable to active terminals Ta not being handed over to inactive cell B1).

A second alternative would be to configure the idle terminal Ti (see FIG. 9) as follows. An idle terminal Ti which, in the procedure of ranking cells for cell reselection, detects the highest-ranking cell (best cell) to have its probing flag set, first sends a report (comprising an indication of the terminal identity and of the best cell identity) to the cell it currently camps on and only subsequently performs cell reselection to the best cell (see the box beside 6-IV in FIG. 6). Different from the first method illustrated in FIG. 5, and different from the second method's basis described above, terminals Ti will send their reports via active cell A1, instead of via inactive cell B1. Thus, again, an inactive cell needs not to support reception of LA Update messages.

Different from the first method, the inactive cells are configured with a nominal period for LA Updates. In this case, to prevent that LA Updates are sent to the inactive cell, the inactive cell may be configured with an infinite LA Update period during the period(s) wherein the presence signal P is transmitted in the inactive cell.

The information obtained from step 6-IV (and possibly step 6-I) may be taken into account in the evaluation by the processing system 5 about which of the inactive cells should be activated and which of the inactive cells should not. The processing result can be analyzed against the at least one activation condition.

After sufficient information has been obtained in step 6-IV, in the active cell A1 the system information (SIBs) may be reverted to normal operating conditions. A paging message may be issued indicating modified system information. This paging message is also received by idle terminals still camping on the original active cell A1. An idle terminal camped on the active cell will remain camped there.

Also, after the decision in step 6-IV, in the inactive cells decided to be activated, the system information (SIBs) may be reverted to normal operating conditions including removal of the probing flag. This system information modification may, but not necessarily needs be announced in the activated cells. An idle terminal camped on any of the activated cells will remain camped there.

Figure 6:
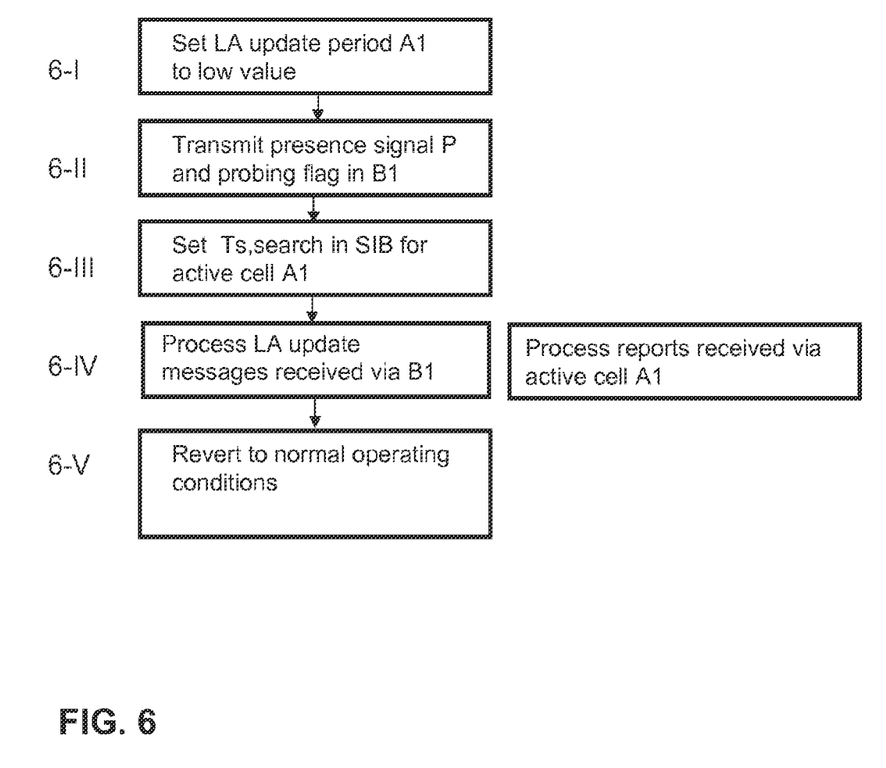

A reset to normal operating conditions is indicated in step 6-V, including a reset to the nominal LA update value for cell A1 and to remove the probing flag in activated cell(s) B1 in FIG. 6.

Still further, after the decision obtained from the processing of step 6-IV, the inactive cells that are decided to be not activated may be switched off, i.e. the presence signal P is no longer transmitted in these cells. Idle terminals camped on such a cell will perform cell selection and find a suitable cell (possibly reselecting the active cell A1, possibly reselecting one of the activated neighbour cells B1, possibly reselecting another neighbour cell).

It should be appreciated that the need to issue a paging message in order to have idle terminals read system information is RAT dependent.

Figure 7:
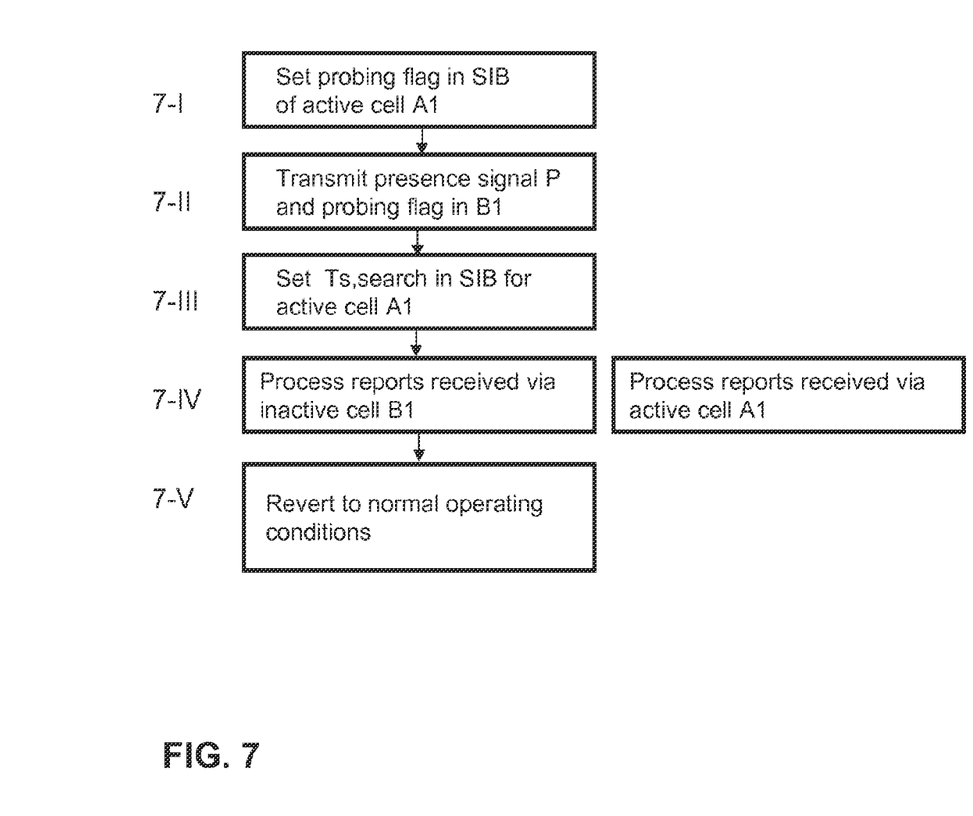

In a third method, illustrated in the flow chart of FIG. 7, the reporting identifier, also referred to as probing flag, is broadcasted in both the active cell A1 and the inactive cell B1. This third method does not rely on frequent periodic LA updates.

In step 7-I, the system information (SIB) to be broadcasted on the broadcast channel of the active cell A1 comprises a probing flag. In the active cell, a paging message may be issued indicating modified system information. This paging message is also received by idle terminals camping on the active cell A1.

An idle terminal Ti, detecting the probing flag, is configured (see FIG. 9) to report information about its identity (e.g. IMSI) and best cell (in this case, likely the active cell A1) to the cell it camps on. The information about the cell identity is not necessarily included in the report but may be added by the cell via which the report is sent. The report is sent once, on first detection of the probing flag being set. It is an option that an idle terminal Ti which has reselected another active cell will not send a report, which would prevent unnecessary reports to be received in other active cells. The telecommunications infrastructure (more precisely the processing system 5) receives the reports and may derive how many and which terminals Ti are currently camping on the active cell. This provides the information about the situation regarding idle terminals before the probing period starts.

Then, in step 7-II, a probing flag is also transmitted in the inactive cell(s) B1 and the presence signal P is transmitted as well.

In the active cell A1, the absolute signal level threshold Ts,search parameter is set higher than nominal (e.g. nominal value+[5,10] dBm) and in step 7-III is broadcast in the system information (SIB) on the broadcast channel of the cell. This parameter controls the conditions when an idle terminal Ti searches for neighbour cells. A paging message may be issued indicating modified system information. This paging message is also received by idle terminals Ti camping on the cell. It should be appreciated that for some RATs (e.g. UMTS) an idle terminal Ti will execute the cell reselection evaluation process when triggered by a modification of the information on the BCCH used for the cell reselection evaluation procedure (i.e. when this particular SIB is modified).

As a consequence, an idle terminal for which the absolute received signal level of the active cell A1 is below the adjusted threshold Ts,search measures the neighbours. For some RATs (e.g. UMTS) a terminal will perform such measurements regardless the setting of Ts,search.

An idle terminal Ti for which the specified conditions are satisfied performs cell reselection. The condition for cell reselection may be based on ranking the active cell A1 (based on Srxlev or Squal and adding Qhyst) and all (inactive and active) neighbour cells (based on Nrxlev or Nqual and adding neighbour-specific Qoffset,n). If the highest-ranked cell is not the active cell A1, then the idle terminal Ti will make the cell reselection to the highest-ranked cell.

An idle terminal persisting to camping on the active cell A1 sends a report as described above for step 7-I regarding the active cell A1 to the active cell A1. An idle terminal Ti which reselects to an inactive cell (the terminal may detect this from the probing flag in the inactive cell's broadcast channel) is configured to, shortly after performing the reselection, send a report as described for step 7-I to the selected inactive cell (see FIG. 9). The report is sent once, on first detection of the probing flag being set in the cell it is camped on and to the cell it is camped on. It is an option that an idle terminal which has reselected another active cell will not send a report, which would prevent unnecessary reports to be received in other active cells. An idle terminal reporting a cell reselection to an inactive neighbour cell may be further configured to also report the presence of the probing flag in its report. This could ease bookkeeping at the processing system 5 regarding the neighbour state (probing or nominal).

After a transitional period (whose length may depend on the duration of the cell reselection procedure and time to send the associated reports), the telecommunications infrastructure 1 (more precisely, the processing system 5) may derive from the received reports how many and which idle terminals remain camped on the active cell A1, how many and which idle terminals have reselected an inactive cell (and which inactive cell) and, possibly, how many and which idle terminals have reselected from the active cell to other cells. This provides an estimate about the situation regarding idle terminals when each of the inactive cells B1 will be activated.

Again, in order to decrease the burden on the inactive cell B1, a first alternative would be to configure the idle terminal Ti (see FIG. 9) as follows. An idle terminal Ti which, in the procedure of ranking cells for cell reselection, detects the highest-ranking cell (best cell) to have its probing flag set, does not perform cell reselection to that cell as long as it has its probing flag set, yet may remain camping on such a cell; it sends a report (comprising an indication of the terminal identity and of the best cell identity) to the cell it currently camps on (see the box beside 7-IV in FIG. 7). Comparable to the second method's first alternative, terminals Ti will send their reports via active cell A1, instead of via inactive cell B1. Thus, an inactive cell in this first alternative needs not to support reception of reports as described above.

A second alternative would be to configure the idle terminal Ti (see FIG. 9) as follows. An idle terminal Ti which, in the procedure of ranking cells for cell reselection, detects the highest-ranking cell (best cell) to have its probing flag set, first sends a report (comprising an indication of the terminal identity and of the best cell identity) to the cell it currently camps on and only subsequently performs cell reselection to the best cell (see the box beside 7-IV in FIG. 7). Comparable to the second method's second alternative, terminals Ti will send their reports via active cell A1, instead of via inactive cell B1. Thus, again, an inactive cell B1 needs not to support reception of reports as described above.

The information obtained from step 7-IV (and possibly step 7-I) may be taken into account in the evaluation by the processing system 5 about which of the inactive cells should be activated and which of the inactive cells should not. The processing result can be analyzed against the at least one activation condition.

After sufficient information has been obtained in step 7-IV, in the active cell A1 the system information (SIBs)

may be reverted to normal operating conditions (which also includes removal of the probing flag). A paging message may be issued indicating modified system information. This paging message is also received by idle terminals still camping on the original active cell A1. An idle terminal camped on the active cell will remain camped there.

Also, after the decision in step 7-IV, in the inactive cells decided to be activated, the system information (SIBs) may be reverted to normal operating conditions including removal of the probing flag. This system information modification may, but not necessarily needs be announced in the activated cells. An idle terminal camped on any of the activated cells will remain camped there.

A reset to normal operating conditions is indicated in step 7-V including a removal of the probing flags in active cell A1 and activated cell(s) B1.

Still further, after the decision obtained from the processing of step 7-IV, the inactive cells that are decided to be not activated may be switched off, i.e. the presence signal P is no longer transmitted in these cells. Idle terminals camped on such a cell will perform cell selection and find a suitable cell (possibly reselecting the active cell A1, possibly reselecting one of the activated neighbour cells B1, possibly reselecting another neighbour cell).

It should be appreciated that the need to issue a paging message in order to have idle terminals read system information is RAT dependent. Finally, in a fourth method, illustrated in the flow chart of FIG. 8, a measurement-and-report paging message, hereinafter denoted as paging message, is transmitted in the active cell A1 instructing the idle terminals Ti to obtain and report information on the inactive cells B1. The idle terminals Ti listen to broadcast and paging channels and can be triggered, using these channel(s), to obtain information on the inactive cells B1. The method may be combined with probing flags transmitted in the inactive cells.

Figure 8:
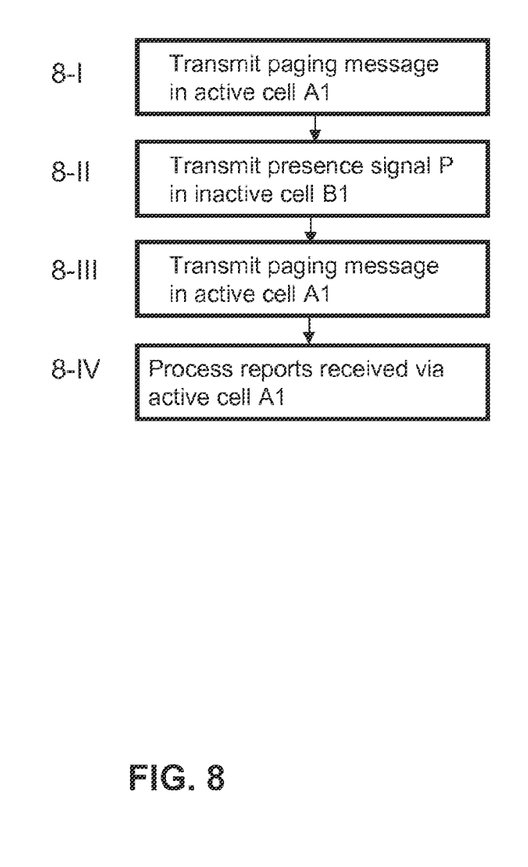

In a first optional step 8-I, a paging message is transmitted in the active cell A1. The paging message may optionally comprise configuration parameters (see below), which configuration parameters are to be applied by the idle terminal Ti.

In response to step 8-I, an idle terminal receiving the paging message is configured (see FIG. 9) to perform measurements on the serving cell (in this case the active cell A1) and on its neighbour cells, regardless the criterion settings for initiating a search (such as parameter Ts,search), and to subsequently send a report, by default to the cell that issued the paging message (in this case the active cell A1). After sending the report, a cell reselection may be performed. The idle terminal can be configured to not performing cell reselection as long as the highest-ranked cell has the probing flag set (comparable to the first alternative of the second or third method).

As indicated above, the paging message may optionally comprise configuration parameters. Examples are parameters that further specify the measurements to be made (which terminals should measure, which cell(s) to be measured, which RAT to be measured, which characteristics, etc.), parameters that further specify the subsequent reselection (such as offset or hysteresis parameters) and parameters that further specify the report to be provided (whether or not to provide a report, how many of the best cells to be reported, which quantities—e.g. signal level/quality, path loss estimates—to be reported, destination of the report, etc.). The paging parameters may alternatively or in addition, include a reference where the (further) parameters may be obtained, e.g. a reference (link) to a broadcast channel or the like, for example when the set of parameters is impractically large to be sent in the paging message itself.

A terminal receiving configuration parameter values in (or associated with) the paging message applies the received values when performing the measurements, the cell reselection procedure and the reporting as commanded by the paging message. It may be that in case of a conflict with an existing parameter having been assigned a value, the value received in the paging message is only applied for the measurements etc. related to the present method. Other procedures continue to apply the already assigned value and are not affected by the value in the paging message.

The reported information includes at least an indication about the terminal identity (e.g. IMSI) and about the identity of the best cell. The report is sent once, on detection of the paging message, and by default (unless instructed otherwise) to the cell that issued the paging message, regardless the cell reselection that may be the result of the search.

The telecommunications infrastructure 1 (more precisely, the processing system 5) receives the reports and may derive how many and which terminals were camping on the active cell A1 and received the paging message and also may derive how many and which terminals are likely to remain camping on the active cell A1 after the paging message. This provides the information about the situation regarding idle terminals before the probing period starts.

Step 8-I is an optional step that may e.g. be omitted if the processing system 5 has no particular interest in obtaining information about the situation regarding idle terminals Ti in the active cell A1 before the start of transmitting the presence signal P in the inactive cell(s) B1.

Step 8-II involves the transmission of the presence signal P in the inactive cell(s). A probing flag may also be transmitted. Optionally, one or more of the inactive cells may be configured with system information parameters different from the normal operating conditions, e.g. values set specifically for the method.

Optionally, as described for previous methods illustrated in FIGS. 5-7, the active cell A1 may be configured with system information parameters different from the normal operating conditions, e.g. values set specifically for the probing phase. It is, however, envisaged that the possibility to specify configuration parameters in (or associated with) the paging message, has advantages over making temporary modifications to system information parameters.

In step 8-III, again a paging message is transmitted in the active cell A1. The paging message may optionally comprise configuration parameters as described above. The values of these parameters may be different from those in the paging message optionally transmitted in step 8-I in active cell A1.

In order to decrease the load of reports, the paging message may also instruct only a fraction f of the idle terminals Ti in the active cell A1 to perform measurements and to provide a report. Mechanisms, such a paging groups, can be used to address or to instruct a particular fraction f (subset) of the idle terminals Ti. A fraction f of the idle terminals may also be established by configuring the idle terminal Ti to, randomly or deterministically determined, only provide the requested reports for a fraction f of the requests.

In response to step 8-III, an idle terminal receiving a paging message is configured to perform measurements on the serving cell (in this case the active cell A1) and on its neighbour cells, regardless the criterion settings for initiating a search, and to subsequently send a report (in this case to the default which is the cell that issued the paging message, i.e. active cell A1). The report is sent once, on detection of the paging message. After sending the report a cell reselection may be performed. The idle terminal can be configured to not performing cell reselection as long as the highest-ranked cell has the probing flag set.

The report includes at least an indication about the identity of the best cell and preferably an indication about the terminal identity (e.g. IMSI). The report may additionally include the status of the probing flag, if any, of the reported best cell.

The telecommunications infrastructure 1 (or more precisely, the processing system 5) receives the reports and may derive from the received reports how many and which idle terminals are likely to remain camped on the active cell, how many and which idle terminals are likely to reselect to an inactive cell (and which inactive cell) and, possibly, how many and which idle terminals are likely to reselect to another cell (and which other cell). This provides an estimate about the situation regarding idle terminals when each of the inactive cells will be activated (step 8-IV).

The information obtained from step 8-IV (and possibly step 8-I, when performed) may be taken into account in the evaluation by the telecommunications infrastructure 1 (more precisely processing system 5) about which of the inactive cells to activate and which not.

If the system information of the active cell A1 has been set differently for the execution of the method than during normal operating conditions, then the system information for the active cell may be reverted back to normal operating conditions (not shown in FIG. 8).

If the inactive cell B1 is activated the following applies. If a probing flag was set, the probing flag may be removed. This system information change need not be announced by a paging message in the relevant cell(s). If the system information of the inactive cell has been set differently for the probing phase than during normal operating conditions, then the system information for the cell may be reverted back to normal operating conditions. If a probing flag was not set, an idle terminal camped there, will remain camped there.

If the inactive cell B1 is decided to not be activated, it may be switched off. If a probing flag was not set in the cell, an idle terminal camped there will perform cell selection and find a suitable cell (possibly reselecting the active cell A1, possibly reselecting one of the activated neighbour cells, possibly reselecting another neighbour cell).

A paging message may be transmitted again after activating inactive cells wherein a probing flag was transmitted. In this case a primary objective is to actually let an idle terminal camped on the active cell A1 perform a reselection to one of the activated neighbour cells B1, when such reselection is still applicable. The processing system 5 may choose to either ignore the reports or to process the reports to assess the final configuration or to have it confirmed. If the system has no interest in assessing/confirming the final configuration, this paging message may advantageously specify a configuration parameter indicating that no reports are to be sent.

It should be appreciated that 3GPP already specified functions for information gathering by a terminal such as described in 3GPP TS 37.320 "Radio Measurement collection for Minimization of Drive Tests (MDT)", which allows to configuring active terminals and/or idle terminals to perform measurements and to report the result to the network. With the described approaches, the responsiveness of the MDT measurements may be greatly improved and be made better suited to also gather information for the purpose of deciding which inactive cell(s) to activate.

In some of the methods and alternatives for triggering idle terminals Ti as described above, it may occur that an idle terminal Ti which camps on an inactive cell B1 initiates a session (e.g. initiates a voice or a data call). There are various ways to handle this situation.

When the inactive cell, despite its 'inactive' status, is to a sufficiently large extent operational, it may choose to accept the request and to support the call in the normal way, at least temporarily. Subsequently, the inactive cell may attempt to handover the call to an active cell; alternatively it may continue serving the call until a decision has been taken about the activation (or not) of that cell. If activated, it may continue to serve the call as an active cell; if not activated, it may handover the call to an active cell before the inactive cell is switched off.

When the inactive cell has insufficient capabilities to accept and/or support a call, or when it is otherwise undesirable to do so, the inactive cell may deny the call request. Various wireless access technologies provide a mechanism to elegantly and quickly refer a refused caller to an alternative, e.g. 'directed retry'. In that case, the inactive cell only needs to support the corresponding signalling.

Finally, note that by using a probing flag in an inactive cell and by using an idle terminal configured to not actually reselect to or camp on a cell which has its probing flag set (also see the first alternative of the second and third method and see the fourth method), it can be prevented that idle terminals actually camp on an inactive cell.

In each of the above methods, the process of counting how many idle terminals will perform cell reselection may use a hysteresis Qhyst in the terminal for the measurement result.

Similarly, a neighbour-specific offset Qoffset,n can be applied to (e.g. added to) the measurement result in the terminal. By means of these cell-specific offsets a cell may be either be promoted or demoted in the ranking of cells for cell reselection.

In the above-described methods, conditions for cell reselection have been frequently addressed. In addition to these conditions, there may be various other conditions that determine whether a cell is suitable to be camped on by the idle terminal. It is assumed that all inactive neighbours are classified as a 'suitable cell', e.g. their Nrxlev and Nqual are sufficiently high to consider them for camping. It is also assumed that suitable averaging is applied to the measurements. Additionally, it is assumed that a (minimum) period is taken into account for which a highest-ranked cell has to be different from the current (active) cell before actually performing a cell reselection. This minimum period (timer) may also broadcasted via the broadcast channel of the cell in the same SIB.

For the measurement of inter-frequency or inter-RAT neighbour cells, active terminals Ta need some (measurement) time gaps to carry out the measurement. This might be managed by using the idle period provided by discontinuous reception (DRX) or radio resource scheduling. One example is the so called "compressed mode" in UMTS networks, where the data rate (and also transmit power) is temporarily doubled, so the data can be sent twice as fast and the resulting time gap could be used for inter-frequency of inter-RAT measurement.

Figure 9:
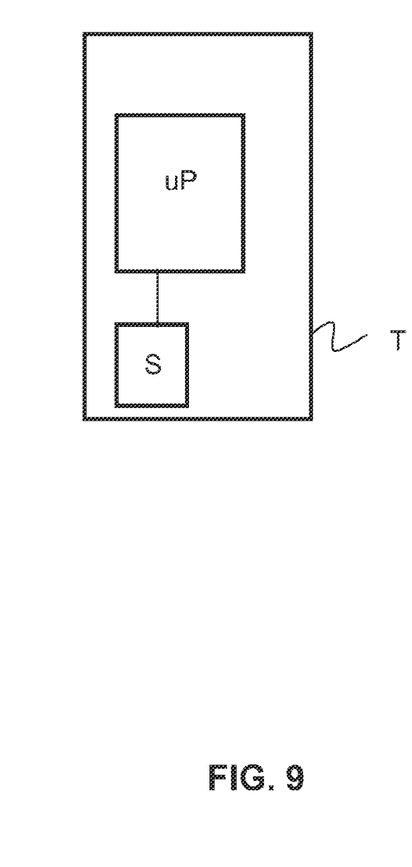

Whereas the disclosed method and telecommunications infrastructure use existing measurement and reporting capabilities of wireless terminals, in at least some of the above-described embodiments the capabilities of wireless terminals should be adapted to participate in these embodiments. Examples have been indicated above and include the recognition, processing and actions performed for cell reselection, in response to the reporting identifier (probing flag) and/or the measurement-and-reporting paging message of the above-described fourth method. Most of these enhanced capabilities will be obtained by software modifications in the wireless terminals. Therefore, FIG. 9 is a highly schematic illustration of a wireless terminal T comprising storage S and processor uP configured for storing and operating the modified software. For a base station BS A, BS B similar considerations apply.

Other network elements and signalling may also be affected, depending on how and where the modules 2~6 (as shown in FIG. 2) are deployed. One option is that the modules are deployed in a centralized fashion in the operation and management centre (OMC), the main impact may then be to the signalling messages that are carried between the OMC and base stations BS A and BS B.

Another option is that the modules are deployed in a distributed fashion in the radio network, e.g. in RNC (Radio Network Controller) of UMTS or eNodeB (LTE term for base station) of LTE. Then, additional signalling between these network nodes is required. For example, if BS A is an UMTS base station and BS B is an LTE base station, additional signalling between RNC and eNodeB is required for the purpose of this invention.

The invention claimed is:

1. A terminal configured for operating in a wireless access telecommunication infrastructure comprising an active base station and at least one inactive cell, wherein the terminal comprises:

a processor for executing instructions that cause the terminal to carry out operations including:

receiving in a transmission from the active base station measurement parameters and/or reporting parameters, wherein the received measurement parameters and/or reporting parameters trigger the terminal to obtain information regarding a presence signal from the at least one inactive base station;

receiving the presence signal transmitted from the at least one inactive base station;

obtaining a measurement report regarding the presence signal transmitted from the inactive base station and;

providing the measurement report to the telecommunications infrastructure via the active base station, wherein the operations further include:

receiving a reporting identifier transmitted from the inactive base station, the received reporting identifier indicating that the inactive base station is in a probing period;

recognizing the reporting identifier; and including the reporting identifier in the measurement report, the included reporting identifier being an indication to the telecommunications infrastructure that the measurement report was not obtained as part of a handover to the inactive base station.

* * * * *